United States Patent [19]

van der Lely

[11] 4,178,996

[45] Dec. 18, 1979

[54] SOIL CULTIVATING MACHINE

[76] Inventor: Cornelis van der Lely, 7, Brüschenrain, Zug, Switzerland

[21] Appl. No.: 840,045

[22] Filed: Oct. 6, 1977

[30] Foreign Application Priority Data

Oct. 12, 1976 [NL] Netherlands .................... 7611244

[51] Int. Cl.² .............................................. A01B 33/06
[52] U.S. Cl. ...................................... 172/59; 172/102; 172/70
[58] Field of Search .................... 172/53, 54, 97, 99, 172/101, 102, 63, 40, 110, 111, 59, 70

[56] References Cited

U.S. PATENT DOCUMENTS

| 1,015,956 | 1/1912 | Hickman | 172/97 |
| 3,186,495 | 6/1965 | Giizenberg | 172/102 |
| 3,520,372 | 7/1970 | Beck | 172/101 |
| 3,930,542 | 1/1976 | Lely et al. | 172/59 |
| 4,003,437 | 1/1977 | Lely | 172/102 X |
| 4,042,038 | 8/1977 | Lely | 172/59 |

FOREIGN PATENT DOCUMENTS

| 1901574 | 8/1969 | Fed. Rep. of Germany | 172/102 |
| 2000368 | 9/1969 | France | 172/40 |
| 7402786 | 3/1974 | Netherlands | 172/59 |
| 646318 | 11/1950 | United Kingdom | 172/97 |

Primary Examiner—Richard J. Johnson
Attorney, Agent, or Firm—Mason, Mason and Albright

[57] ABSTRACT

An implement has two elongated tined carriers that extend transverse to the direction of travel. The carriers are moved through circular orbits around spaced apart driving shafts that extend upwardly. An eccentric for each carrier is journalled to each shaft and includes a disc with encircling ring having support plates that are bolted to the respective carrier. The upper eccentrics extend forwardly from a drive shaft, located between the carriers, to the forward carrier and the lower eccentrics extend rearwardly to the trailing carrier. The carriers are off set relative to one another as well as out-of-phase. An elongated levelling beam is adjustably connected to the forward carrier and a supporting roller is connected to the frame at the rear of the trailing carrier.

20 Claims, 7 Drawing Figures

SOIL CULTIVATING MACHINE

This invention relates to a soil cultivating machine.

According to a first aspect of the present invention there is provided a soil cultivating machine comprising a frame which is provided with at least one carrier which carries working members and which extends transversely of the intended direction of travel of the machine and is orbitally drivable by two spaced eccentric mechanisms connected to the carrier.

According to a second aspect of the present invention there is provided a soil cultivating machine comprising a frame which is provided with at least one carrier which carries working members and which is orbitally drivable by an eccentric mechanism, there being further provided in front of the carrier, with respect to the intended direction of travel of the machine, a levelling member which in operation is orbitally drivable.

According to a third aspect of the present invention there is provided a soil cultivating machine comprising a frame which is provided with two carriers each carrying working members, the two carriers each being orbitally drivable by a respective eccentric mechanism, these eccentric mechanisms being arranged on a common shaft.

According to a fourth aspect of the present invention there is provided a soil cultivating machine comprising a frame and at least two carriers, extending transversely of the intended direction of travel of the machine, which carry working members and are drivable orbitally or in reciprocation during operation, the working members on each carrier being fastened some at the front and some at the rear of the carrier.

According to a fifth aspect of the present invention, there is provided a soil cultivating machine, comprising a frame which is provided with at least one tined carrier which extends transversely of the intended direction of travel and is orbitally drivable in operation, the machine being further provided with a roller, for crumbling soil, disposed behind the carrier, with respect to the intended direction of travel.

For a better understanding of the present invention, and to show how it may be carried into effect, reference will now be made, by way of example only, to the accompanying drawings, in which:

FIG. 6 shows on an enlarged scale part of the machine of FIGS. 1 to 3; and

Figure 1:
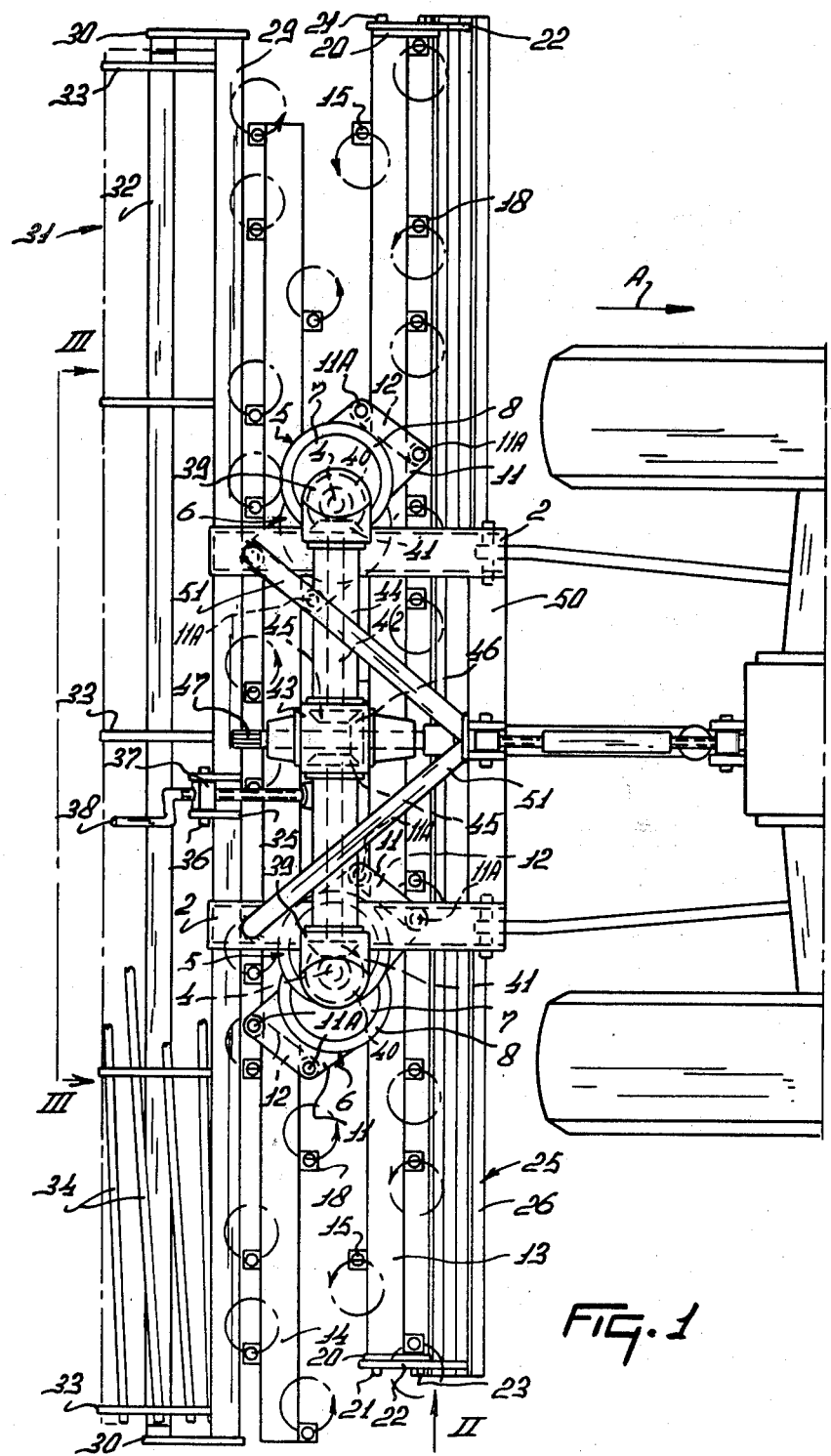
FIG. 1 is a plan view of a soil cultivating machine.
Figure 2:
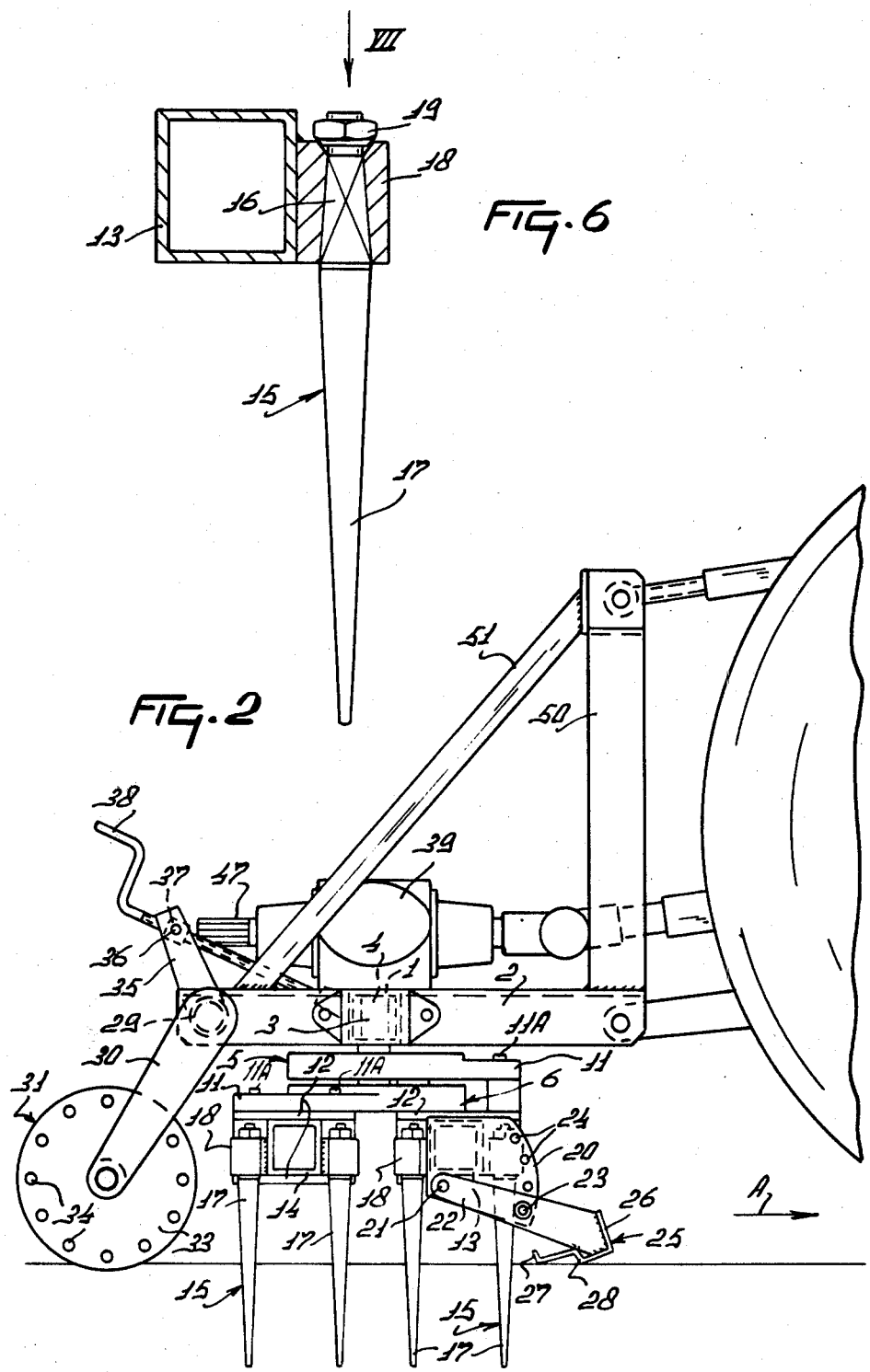
FIG. 2 is an enlarged elevational view taken in the direction of the arrow II in FIG. 1.
Figure 3:
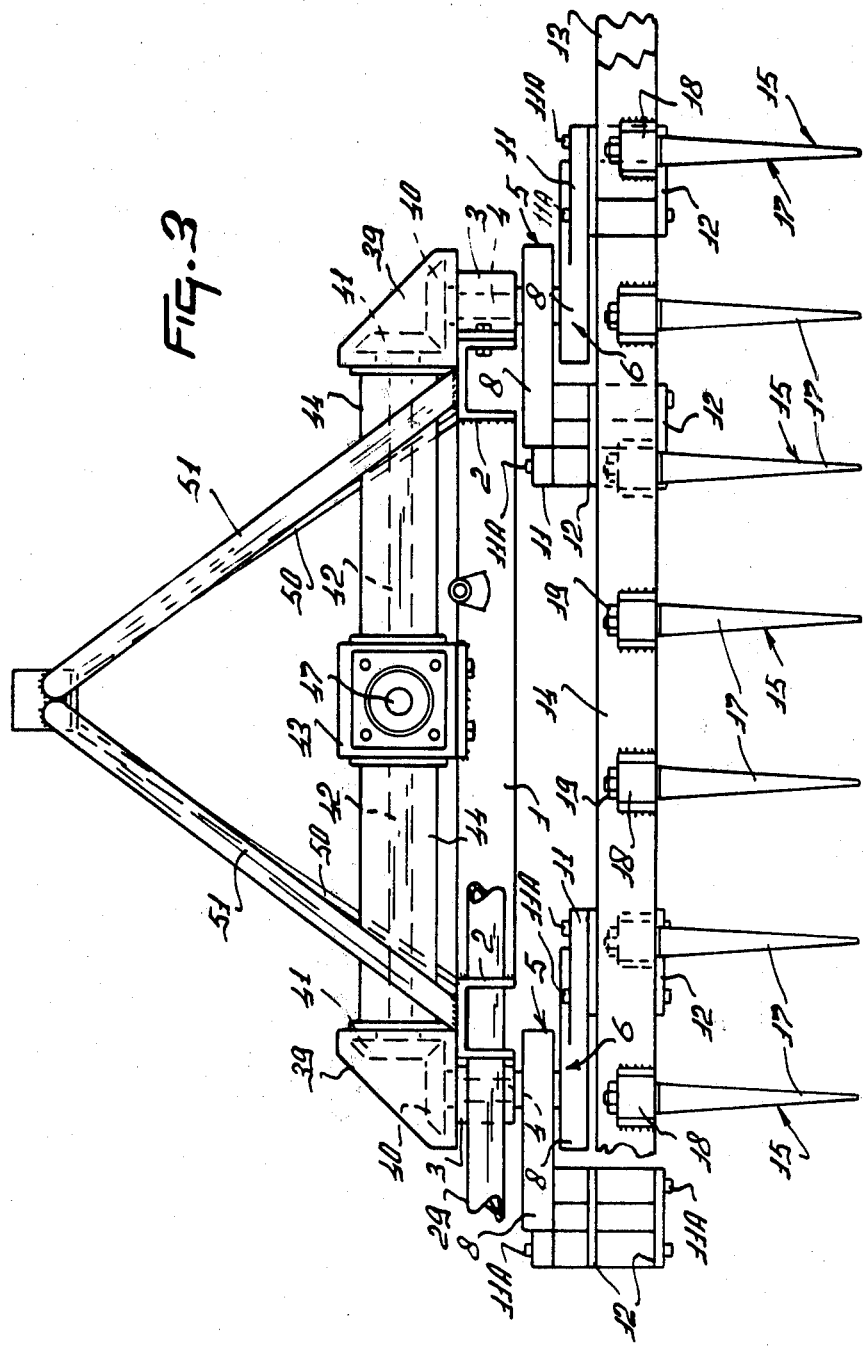
FIG. 3 is an enlarged elevational view taken on the line III—III in FIG. 1.
Figure 4:
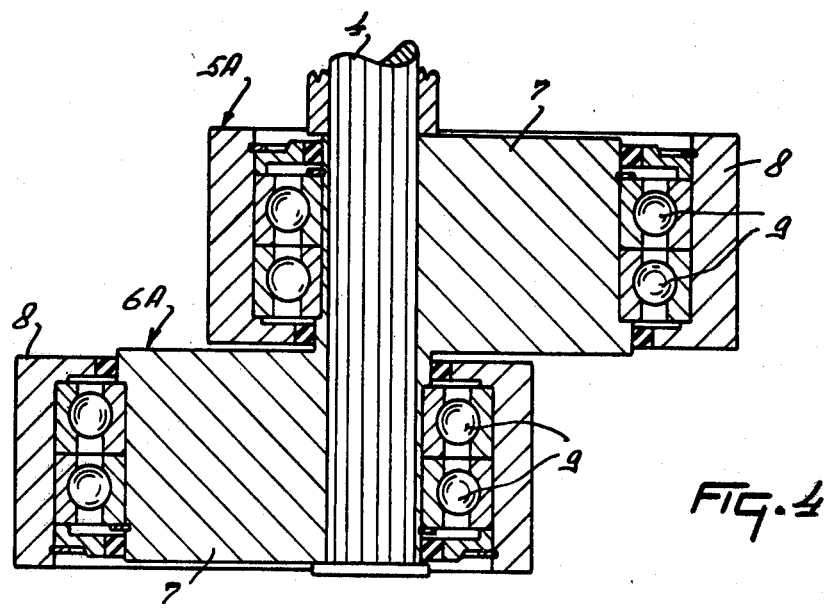
FIG. 4 shows one embodiment of an eccentric mechanism used in the machine of FIGS. 1 to 3.
Figure 5:
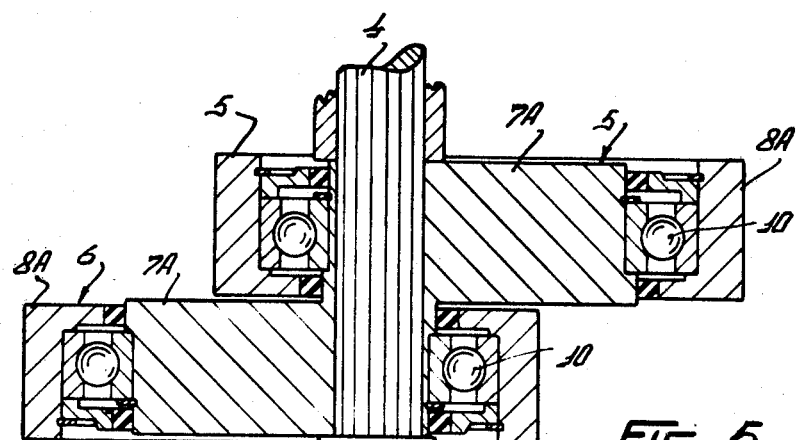
FIG. 5 shows another embodiment of an eccentric mechanism.

FIGS. 1 to 3 show a soil cultivating machine comprising a frame beam 1 extending transversely of the intended direction of travel of the machine during operation. This direction is indicated in FIGS. 1 and 2 by arrows A. The frame beam 1 is provided at its ends with frame beams 2 which extend in the direction of travel A. These beams 2 project beyond the beam 1 over a larger distance at the front than at the rear, as is evident from FIG. 1. The frame beams 2 are channel-shaped and are disposed so that the side walls of the channel extend downwardly. At the level of the frame beam 1 a bearing housing 3 is arranged on the outer side of each beam 2 for accommodating an upwardly, preferably vertically, extending shaft 4. The lower end of each shaft 4 projects from its bearing housing 3 and is provided with two closely overlying eccentric mechanisms 5 and 6. Each eccentric mechanism comprises an eccentric disc 7 arranged on the shaft 4, and a ring 8 which is freely rotatable on the periphery of the disc 7. From FIG. 4 it will be appreciated that the rings 8 of the eccentric mechanisms 5 are supported by two axially spaced ball bearings 9. However, as an alternative, shown in FIG. 5, only one ball bearing 10 may be used for support, in which case the eccentric disc 7A and the ring 8A may then have a smaller thickness. FIG. 1 shows that the eccentric discs 7, or 7A are angularly off-set from one another by 180° about the shaft 4. The lower and upper eccentric mechanisms on the two shafts 4 are arranged in an identical manner. Each ring 8 and 8A arranged on its eccentric disc 7 and 7A respectively carries a support plate 11 which is substantially horizontal. Viewed on plan, the support plates 11 on the ring of each upper eccentric mechanism is inclined forwardly to the left, with respect to the direction of travel A, whereas the support plate 11 on each lower eccentric mechanism 6 is disposed diametrically opposite to this (see FIG. 1). Viewed on plan, the support plates 11 are substantially rectangular and are fastened, at their corners remote from their rings 8, to respective strips 12 by bolts 11A. The strips 12 are secured to the top and bottom sides of carriers 13 and 14 which extend transversely of the direction of travel A (FIG. 2). The carriers 13 and 14 have equal lengths and by their connection with the supports 11 of the respective eccentric mechanisms 5 and 6 they are laterally off-set, viewed on plan, with respect to one another. Each carrier 13 and 14 carries tines 15 arranged over its length and fastened at equal intervals to the carrier, viewed in the direction of movement A. The tines on the rear side of the trailing carrier 14 are disposed in pairs, and between each pair, a single tine is provided on the front side of the carrier. The leading carrier 13, however, is provided at its front side with tines disposed in pairs, and between these pairs, a single tine is provided on the rear side. At each end of the carrier 13, on its front side, is disposed a single tine and between this single tine and the adjacent pair of tines at the front there is provided a single tine at the rear. This kind of tine arrangement, with some tines at the front and some at the back of each carrier, may be useful not only with the present construction, in which the carrier movement is orbital, but also in constructions where the carrier is driven in reciprocation.

Figure 7:
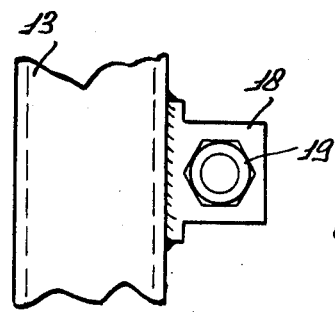
FIG. 7 is a top view taken in the direction of the arrow VII in FIG. 6.

Each of the tines 15 is mounted in a holder 18 by means of a fastening portion 16 which is connected to, and in line with, an operative portion 17. The holder 18 is welded to the respective carrier. The fastening portion 16 of each tine 15 tapers slightly from its junction with the operative portion 17 towards a screw-threaded, free end, onto which a nut 19 is screwed to fix the tine in place, FIGS. 6 and 7 show that each holder 19 has a square shape and is arranged on its carrier so that the top end of the fastening portion 16 of the tine is located level with the top side or the respective carrier 13 or 14. The holder 18 has a recess for receiving the fastening portion 16 and this recess has a square shape like the cross-section of the fastening portion, and also of the tapering operative portion.

The ends of the leading carrier 13 are provided with upwardly extending plates 20 having, viewed from the side, the shape of a sector with an arcuate front edge, the broader part being located at the front. An arm 22 is connected to each plate 20 by a stub shaft 21. The arm 22 is connected near the rear of the plate 20 and extends along the plate towards the front. Each arm 22 can be set in any one of a plurality of different positions by a bolt 23 which passes through the arm and through one of a plurality of holes in the front part of the plate 20. From FIG. 2 it will be apparent that the width of each arm 22 increases from the rear to the front. The front ends of the arms 22 are interconnected by a shaped beam 25 extending transversely of the direction of travel A. The beam 25 is generally channel-shaped and is disposed to that the side walls 26, 27 of the channel are inclined upwardly and rearwardly. The front side wall 26, which is secured to the arms, has a length equal to about four times the length of the rear side wall 27. The web between the side walls 26 and 27 is shaped so that a ridge 28 is formed about midway between the side walls. The ridge 28 and the rear of the beam 25 bear on the ground during operation.

The rear ends of the frame beams 2 have openings through which passes a tube 29 which extends transversely of the direction of travel A and which is provided near its ends with downwardly and rearwardly extending arms 30. Between the arms 30 is arranged supporting member 31 in the form of a roller, which is freely rotatable. The roller 31 comprises a roller support 32 provided at the ends and at locations between the ends with circular supports 33. At the circumference of each support 33 a plurality of openings are provided in which elongated elements 34 in the form of bars are helically arranged about the rotary axis of the roller. Near the center of the machine the tube 29 is provided with two spaced ears 35 which are inclined upwardly and rearwardly away from the tube. Between the ears 35 is arranged a screw-threaded support 37 mounted on a stub shaft 36. The support 37 co-operates with a screw spindle 38 one end of which is rotatably arranged in a retaining member on the rear side of the frame beam 1.

The top ends of the shafts 4 project into gear boxes 39 mounted on the frame beams 2. Inside each gear box 39 the shafts 4 are each drivably connected by bevel pinions 40 and 41 with a shaft 42, which extends into a gear box 43 located between the two gear boxes 39. The gear box 43 is connected to the gear boxes 39 by tubes 44 which surround the shafts 42. Inside the gear box 43 each shaft 42 is drivably connected by bevel pinions 45 and 46 to a shaft 47, which projects from the front and rear sides of the gear box 43.

Between the frame beams 2 and at the front of the machine is provided a hitch 50 for coupling the machine with the three-point lifting device of a tractor. The top side of the hitch 50 is secured by downwardly diverging supports 51 to the rear ends of the frame beams 2.

For operation the machine is coupled by means of the hitch 50 with the three-point lifting device of a tractor and the shaft 47 protruding from the front side of the gear box 43 is linked by an auxiliary shaft with the power take-off shaft of the tractor. When the shaft 47 is connected to the power take-off shaft and the machine is travelling in the direction of the arrow A, the carriers 13 and 14 are driven orbitally by the eccentric mechanisms 5 and 6 so that the tines 15 also move around such an orbit which in this embodiment is substantially circular and lies in the horizontal plane. The pairs of tines 15 on the carriers 13 and 14 are disposed so that the intervals between them are about twice the diameter of the path or orbit described so that the tines on the two carriers work overlapping strips of soil during operation, while, owing to their circular movement, they bring about an intensive crumbling of the soil. The beam 25 at the front, which constitutes a levelling member, and the freely rotatable roller 31 at the rear can be adjusted to alter the working depth of the tines. Also, by adjusting the levels of the beam 25 and the roller 31, the assembly can be turned about an axis extending transversely of the direction of travel A to give the tines a position inclined to the horizontal.

In the construction described above of the compact machine the tines on the carriers are caused to move in such a way that the soil can be intensively crumbled up, while the levelling member 25, which, it will be appreciated, also performs an orbital movement because it is fitted to the leading carrier, provides an effective levelling of the soil before the tines reach it. Since the pairs of eccentric mechanisms 5 and 6 provided for each carrier, (which mechanisms may, as an alternative, comprise eccentric discs or cranks) are relatively disposed so that they have a phase difference of about 180°, the machine in operation may run quietly, and undesirable vibrations may not be transferred to the tractor.

While various features of the soil cultivating machine that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. A soil cultivating implement comprising a frame and at least two elongated carriers pivoted to said frame, said carriers extending transverse to the direction of travel, one behind the other and each carrier mounting downwardly extending tine means along the length thereof, driving means comprising common upwardly extending rotary shaft means and a corresponding eccentric mechanism that is pivoted to each carrier being journalled on said shaft means, each carrier being driven by spaced apart respective eccentric mechanisms with rotary shafts located at each side of the centerline of the machine, each rotary shaft having eccentric mechanisms mounted thereon, one above the other, a respective eccentric mechanism being pivoted to each carrier.

2. A soil cultivating machine as claimed in claim 1, wherein an elongated levelling member is positioned in advance of the leading carrier and across the full length of that carrier.

3. A soil cultivating machine as claimed in claim 2, wherein said levelling member is pivotably mounted on the leading carrier and extends generally parallel thereto.

4. A soil cultivating machine as claimed in claim 3, wherein said member is settable in any one of a plurality of positions relative to the level of said leading carrier.

5. A soil cultivating machine as claimed in claim 4, wherein said leading carrier has support plates at the lateral ends and said member is attached by arms to said plates, said arms being pivotable and settable in any one of a plurality of positions relative to the support plates.

6. A soil cultivating machine as claimed in claim 5, wherein said member comprises a channel-section beam and side walls of that beam extend generally upwardly.

7. A soil cultivating machine as claimed in claim 6, wherein a web between the side walls is shaped to form at least one ridge that extends along substantially the entire length of said beam.

8. A soil cultivating machine as claimed in claim 1, wherein each eccentric mechanism comprises an eccentric disc mounted on the corresponding shaft and an encircling ring is journalledd on the disc by bearings.

9. A soil working machine as claimd in claim 8, wherein two axially spaced apart ball bearings are positioned between said disc and ring.

10. A soil cultivating machine as claimed in claim 8, wherein the upper eccentric mechanism on each shaft is pivoted to the leading carrier and the lower eccentric mechanism on each shaft is pivoted to the trailing carrier.

11. A soil cultivating machine as claimed in claim 10, wherein said ring has a support pivoted to a respective carrier.

12. A soil cultivating machine as claimed in claim 11, wherein the supports of the upper mechanisms are positioned diametrically opposite the supports of the lower mechanisms with respect to their shafts.

13. A soil cultivating machine as claimed in claim 12, wherein the two mechanisms on each shaft are angularly displaced relatively to each other by about 180°.

14. A soil cultivating machine as claimed in claim 1, wherein tines are fastened to each carrier, fore and aft with respect to the direction of travel.

15. A soil cultivating machine as claimed in claim 1, wherein the front of the leading carrier has more tines than the front of the trailing carrier.

16. A soil cultivating machine as claimed in claim 15, wherein each tine comprises a fastening portion in a holder fixed to the respective carrier, said fastening portion being connected to a straight operative tine portion that has a non-circular cross-section, the two portions being in line with each other.

17. A soil cultivating implement comprising a frame and two elongated carriers pivoted to said frame, said carriers extending transverse to the direction of travel, one behind the other and each carrier mounting downwardly extending tine means along the length thereof, driving means comprising two spaced apart driving shafts that extend upwardly and are located between said carriers, a corresponding eccentric mechanism for each carrier being journalled on each shaft one above the other, each mechanism including a support plate that interconnects the respective carrier to a corresponding eccentric, said plate being driven in horizontal orbits around the shaft during operation.

18. A soil cultivating machine as claimed in claim 17, wherein a trailing roller is mounted on a shaft support between arms which are pivotally mounted on the frame, a centrally located adjusting device being connected to adjust the level of said support relative to the frame.

19. A soil cultivating machine as claimed in claim 18, wherein said adjusting device is a screw spindle.

20. A soil cultivating machine as claimed in claim 18, wherein said support is pivotably mounted in holes extending through two relatively spaced frame beams and each of said frame beams extends in the direction of travel.

* * * * *